(12) United States Patent
Lowrey

(10) Patent No.: US 12,390,893 B2
(45) Date of Patent: Aug. 19, 2025

(54) WELDING JIG

(71) Applicant: WIREMAN PTY LIMITED, New South Wales (AU)

(72) Inventor: Ian Lowrey, New South Wales (AU)

(73) Assignee: WIREMAN PTY LIMITED, New South Wales (AU)

( * ) Notice: Subject to any disclaimer, the term of this patent is extended or adjusted under 35 U.S.C. 154(b) by 623 days.

(21) Appl. No.: 17/904,335

(22) PCT Filed: Feb. 11, 2021

(86) PCT No.: PCT/AU2021/050116
§ 371 (c)(1),
(2) Date: Aug. 16, 2022

(87) PCT Pub. No.: WO2021/163753
PCT Pub. Date: Aug. 26, 2021

(65) Prior Publication Data
US 2023/0060153 A1    Mar. 2, 2023

(30) Foreign Application Priority Data

| Feb. 18, 2020 | (AU) | 2020900451 |
| May 28, 2020 | (AU) | 2020901745 |
| Oct. 15, 2020 | (AU) | 2020903737 |

(51) Int. Cl.
*B23K 37/04*       (2006.01)
*B23K 37/0533*   (2025.01)

(52) U.S. Cl.
CPC ...... *B23K 37/0443* (2013.01); *B23K 37/0533* (2013.01)

(58) Field of Classification Search
CPC ............ B23K 37/0408; B23K 37/0443; B23K 37/0533
See application file for complete search history.

(56) References Cited

U.S. PATENT DOCUMENTS

| 268,088 | A | * | 11/1882 | Evers | B30B 9/3053 100/231 |
| 1,848,527 | A | * | 3/1932 | Hickey | B23K 37/0533 269/130 |

(Continued)

FOREIGN PATENT DOCUMENTS

KR    20180026129 A * 3/2018 ......... B23K 37/0533

*Primary Examiner* — Woody A Lee, Jr.
(74) *Attorney, Agent, or Firm* — POLSINELLI PC

(57) ABSTRACT

A welding jig (3, 103, 203) for holding a horizontal member relative to a vertical member is disclosed. The jig has a base (5, 105, 205) having a clamp (8, 108, 208) able to clamp the base to the vertical member and constituting a first, coarse, vertical adjustment mechanism. A frame (11, 111, 211) is interconnected to the base by a first threaded member (12, 112, 212) constituting a second, fine, vertical adjustment mechanism. A pair of supports (21, 121, 221) is slidingly mounted on the frame and movable between predetermined positions to constitute a first, coarse, horizontal adjustment mechanism. First and second vise parts (43, 44, 143, 144, 271, 272) each threadably mounted on a corresponding one of the supports and movable towards and away from each other constitute a vise mechanism for clamping the horizontal member.

20 Claims, 11 Drawing Sheets

(56) References Cited

U.S. PATENT DOCUMENTS

| | | | | |
|---|---|---|---|---|
| 2,108,077 | A * | 2/1938 | Robinson | B23K 37/0533 33/645 |
| 2,387,154 | A * | 10/1945 | Kalwitz | B21C 37/296 228/262.61 |
| 3,030,903 | A * | 4/1962 | Morris | B23K 37/0531 269/228 |
| 3,664,029 | A * | 5/1972 | Glucoft | G01B 3/00 248/230.9 |
| 3,743,566 | A * | 7/1973 | Louthan | F16L 47/02 285/21.2 |
| 3,901,497 | A * | 8/1975 | Dearman | B25B 5/147 269/130 |
| 3,952,936 | A * | 4/1976 | Dearman | F16L 13/02 269/287 |
| 4,338,712 | A * | 7/1982 | Dearman | B29C 66/52241 228/49.1 |
| 4,545,569 | A * | 10/1985 | Schroder | G21C 19/36 901/42 |
| 4,611,743 | A * | 9/1986 | Williams | B23K 37/053 228/49.1 |
| 5,797,580 | A * | 8/1998 | Ryberg | A47G 33/1213 269/96 |
| 5,866,826 | A * | 2/1999 | Bataille | G02B 27/0176 73/865.6 |
| 6,102,384 | A * | 8/2000 | Simmons | B23K 37/0536 269/37 |
| 6,651,967 | B1 * | 11/2003 | Barber | B23K 37/0533 269/131 |
| 7,617,963 | B1 * | 11/2009 | Jensen | F16L 13/06 228/44.5 |
| 8,186,643 | B2 * | 5/2012 | Luo | F16L 41/008 248/230.8 |
| 8,336,865 | B2 * | 12/2012 | Vandergrift, II | B23K 37/0443 269/95 |
| 8,985,565 | B2 * | 3/2015 | Mann | F16L 23/003 29/430 |
| 2002/0050674 | A1 * | 5/2002 | Babchuk | B23K 37/0533 269/296 |
| 2003/0137092 | A1 | 7/2003 | Melanson | |

\* cited by examiner

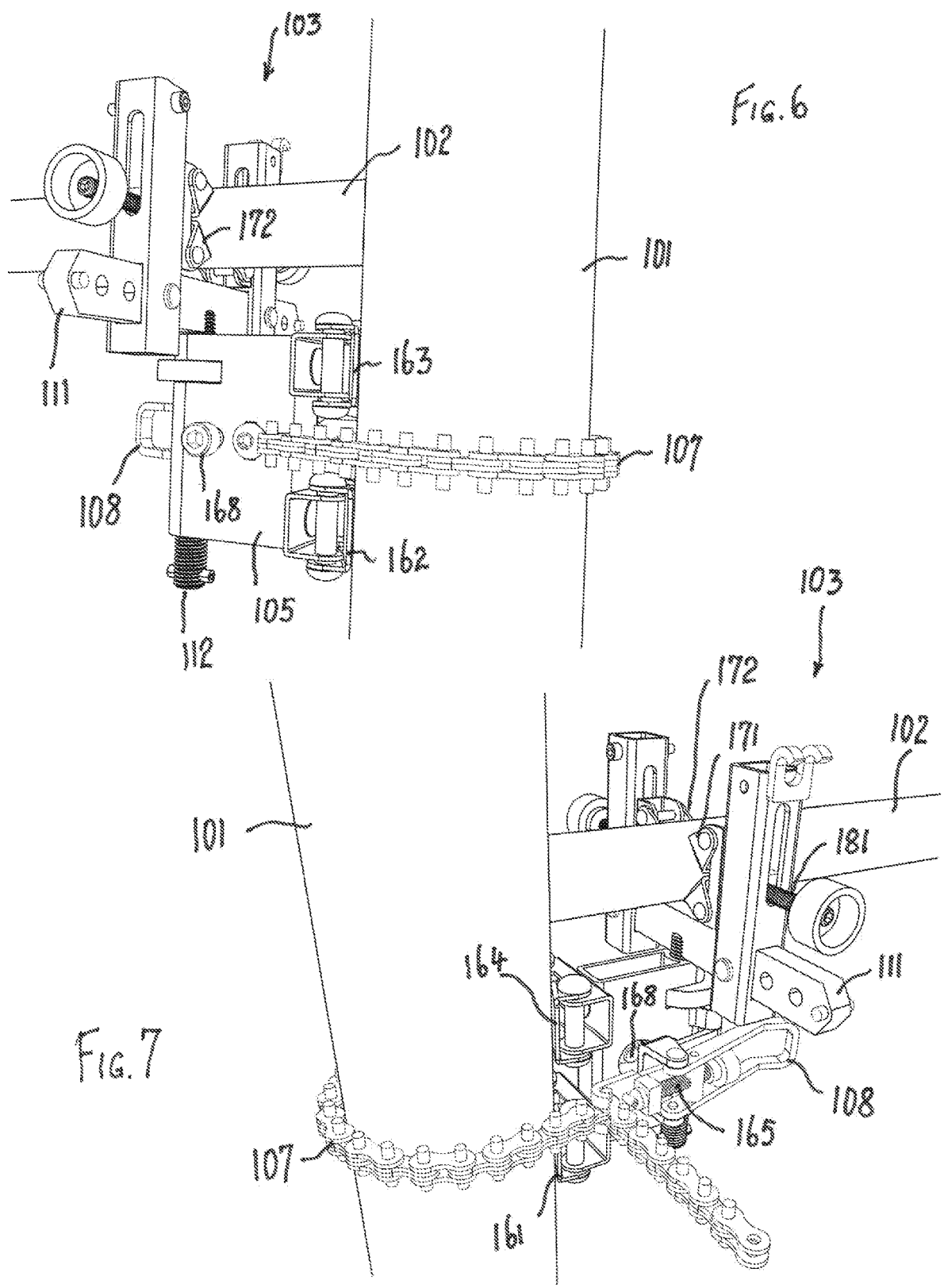

US 12,390,893 B2

WELDING JIG

CROSS REFERENCE TO RELATED APPLICATIONS

This application is a National Phase filing under 35 U.S.C. § 371 of PCT/AU2021/050116 filed on Feb. 11, 2021; which application in turn claims priority to application Ser. No. 20/209,00451 filed in Australia on Feb. 18, 2020, application Ser. No. 20/209,01745 filed in Australia on May 28, 2020 and application Ser. No. 20/209,03737 filed in Australia on Oct. 15, 2020. The entire contents of each application are hereby incorporated by reference.

FIELD OF THE INVENTION

The present invention relates to welding jigs and, in particular, to welding jigs able to be used in remote rural areas.

BACKGROUND ART

Welding jigs are often used to hold two or more parts together in a desired final configuration which then enables the parts to be welded. At the conclusion of the welding, the parts are released from the jig. In most welding shops they are a number of welders or, if only a single welder then at least one other person able to assist in a general capacity. As a consequence, in a welding shop there are more than a single pair of hands able to be brought to bear on any particular welding task.

However, in outback rural areas, such as outback Australia, normally only one person is available to work on any given task. A particular problem which arises is in the erection of cattle yards. Typically cattle yards include a multitude of vertical steel uprights and horizontal rails. Although prefabrication is utilised wherever possible, often the specific requirements of the site, or the individual requirements of the owner, mean that individual and specific fabrication is required.

A typical problem is that whilst a vertical steel upright can be secured by having its lower end partially buried in the ground, horizontal members, such as rails, must be held in their final horizontal position during the welding procedure. Normally this involves a weld at each end of the rail.

If two persons were present, one person could hold the middle of the rail and the other person could weld each end in turn. However, where only one person, the welder, is present, then some sort of apparatus is required to hold the horizontal rail in the desired final position.

In addition, although a bracket may be fixed to a vertical member using a pipe chain or strap clamp, this does not provide much practical assistance to a single person. The ability to hold a bracket and simultaneously manipulate a chain clamp assembly while maintaining a capacity to accurately adjust the clamp so that it can be tightly clamped to a wide range of pipe sizes is beyond the ability of most people when only a single pair of hands is available.

Prior art searches conducted after the priority date have disclosed US Patent Application No US 2016/0097217A1 Loehr which exemplifies the above-mentioned support bracket and clamp technology.

GENESIS OF THE INVENTION

The Genesis of the present invention is a desire to at least ameliorate the above-mentioned problems.

SUMMARY OF THE INVENTION

In accordance with a first aspect of the present invention there is disclosed a welding jig for holding a horizontal member relative to a vertical member, said jig comprising a base having a clamp able to clamp the base to the vertical member and constituting a first, coarse, vertical adjustment mechanism, a frame interconnected to said base by a first threaded member constituting a second, fine, vertical adjustment mechanism; a pair of supports slidingly mounted on said frame and movable between predetermined positions to constitute a first, coarse, horizontal adjustment mechanism; and first and second vise parts each threadably mounted on a corresponding one of said supports and movable towards and away from each other to constitute a vise mechanism, said vise mechanism clamping said horizontal member and having a centre which is horizontally adjustable relative to said vertical member by adjustment of the threaded engagement between said supports and said vise parts.

Preferably, the base clamp comprises a first chain able to be tightened about the vertical member.

Preferably, the first threaded member is rigidly connected to the frame and is threadably engaged with a rotatable adjustment member of the base.

Preferably, the frame has a spaced apart sequence of apertures and each of the supports has an elongate member releasably engageable with one of said apertures to set the predetermined positions.

Preferably, each of the supports has a slot therethrough, each of the vise parts has a female threaded member retained in a corresponding one of the slots, and a male threaded member passes through the corresponding female threaded member.

Preferably, a second chain extends between the supports.

Preferably, the first chain is able to be tightened by a plier like tool.

Preferably, the first chain is able to be tightened by an over centre toggle arm.

Preferably, the rest position of the over centre toggle arm is adjustable.

Preferably, the over centre toggle arm is pivoted relative to a support and the support is pivoted to said base.

Preferably, the over centre toggle arm is adjustable by adjusting the position of said support.

Preferably, the vise or vyce parts comprise pivoted pads.

BRIEF DESCRIPTION OF THE DRAWINGS

A preferred embodiment of the invention will now be described, by way of example only, with reference to the accompanying drawings in which:

FIG. 6 is a perspective view from below of the welding jig of FIG. 4 but in the opposite direction, FIG. 7 is a perspective view from above and looking in yet another direction.

DETAILED DESCRIPTION

Figure 1:
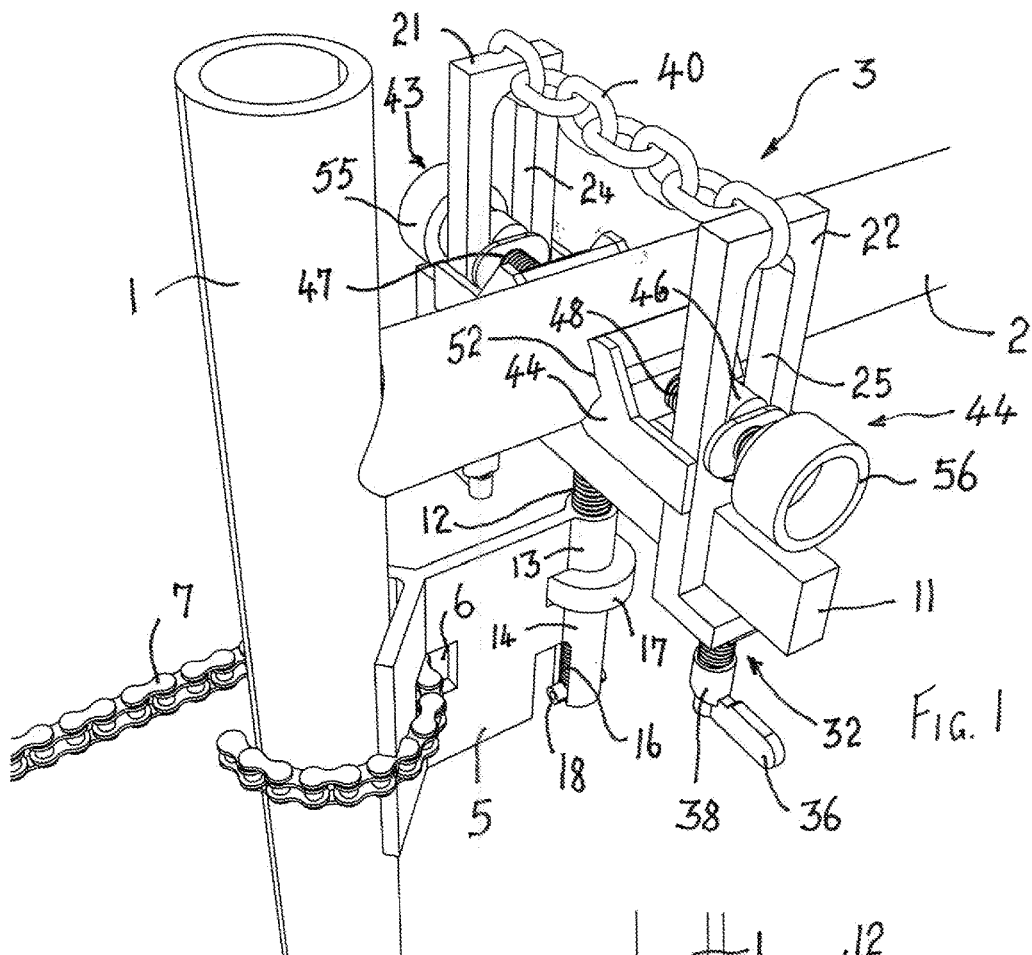
FIG. 1 is a perspective view from above showing the welding jig of the first embodiment.

As seen in FIG. 1, a portion of a cattle yard under construction is illustrated and, in particular, a vertical post 1 and a horizontal rail 2 which are about to be welded are illustrated. The post 1 and rail 2 are held in the intended final position by means of a jig 3.

Figure 3:
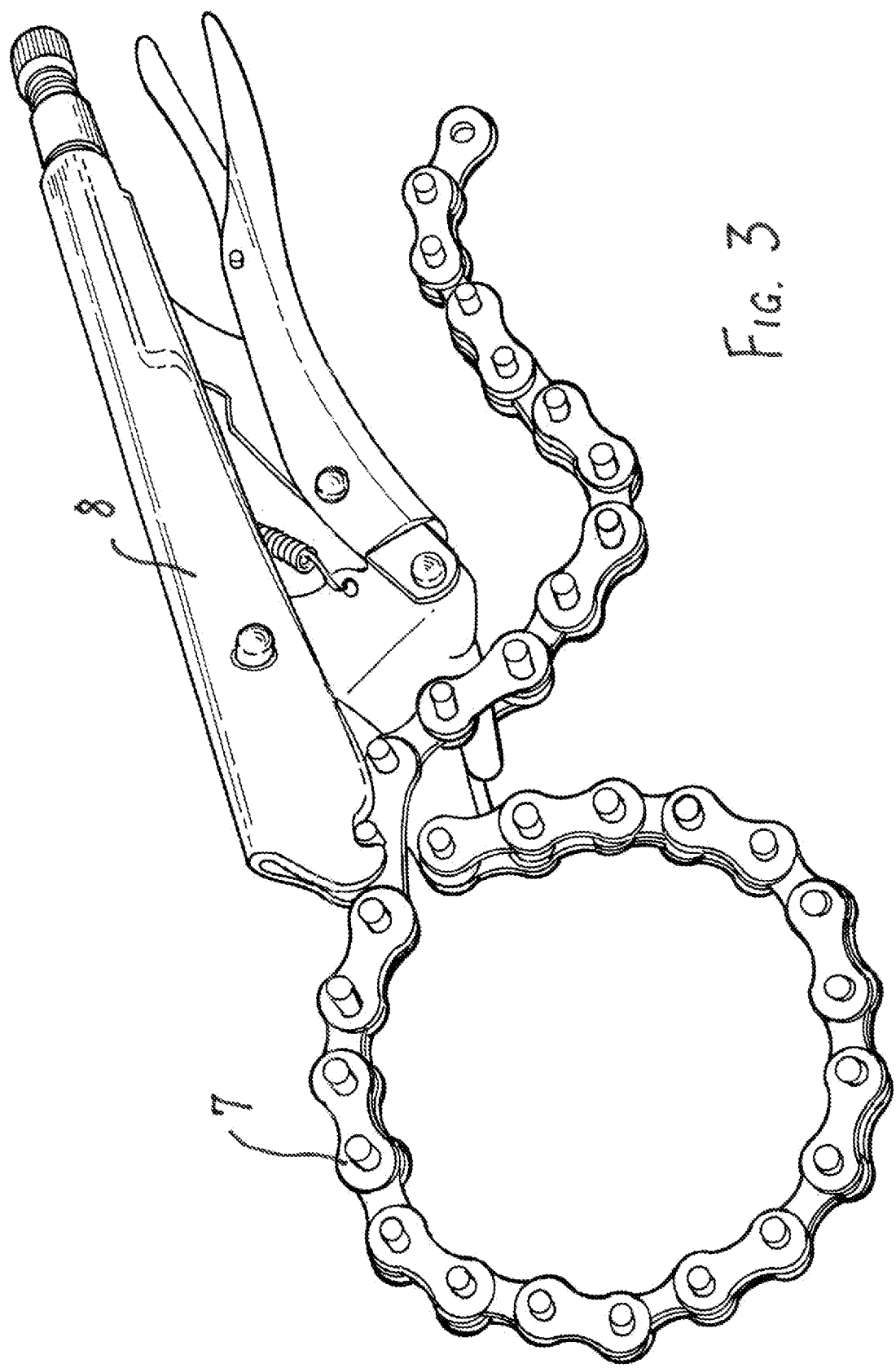
FIG. 3 is a perspective view of the preferred form of chain clamp for use with the jig of FIG. 1.

The jig 3 has a Y-shaped base 5 with a hole 6 through which a chain 7 passes. As seen in FIG. 3, the chain 7 is engaged with a manual implement 8 such as the locking pliers gripping device is sold under the Registered Trade Mark VISE-GRIP. As a consequence, the chain 7 and implement 8 together constitute a clamp which enables the base 5 to be clamped to the vertical post 1.

Referring again to FIG. 1, located above the base 5 is a horizontal frame 11 from which a fixed threaded rod 12 extends downwardly. The threaded rod 12 passes through two sleeves 13, 14. The lower sleeve 14 is slotted at 16. The threaded rod 12 also passes through a rotatable female threaded disc 17. The free end of the rod 12 has an aperture through which a roll pin 18 is inserted, thereby retaining the rod 12 within the sleeves 13, 14. As a consequence, as seen in FIG. 1, rotating the threaded disc 17 either raises or lowers the frame 11.

It will be apparent from the foregoing that the chain 7 and implement 8 constitute a first vertical adjustment mechanism which permits a coarse vertical adjustment to be made, whilst the threaded disc 17 and threaded rod 12 constitute a second vertical adjustment mechanism which permits a fine vertical adjustment of the frame 11 to be made.

Figure 2:
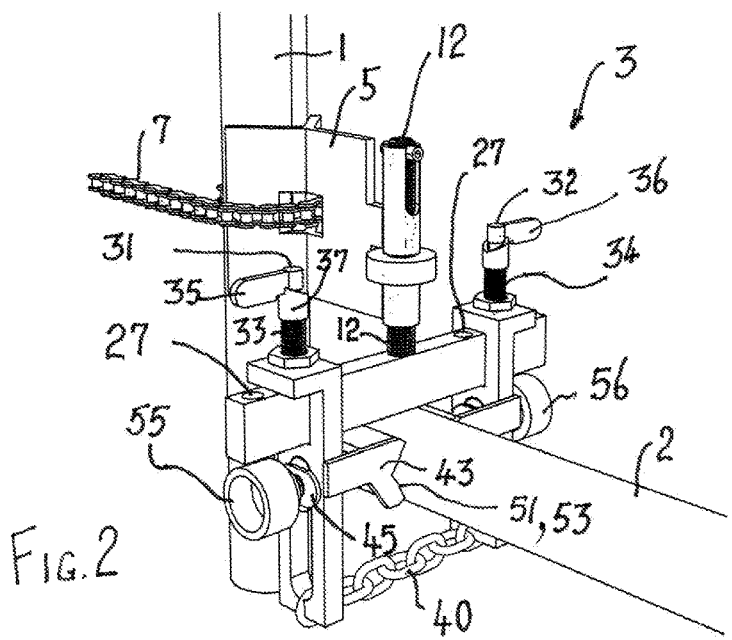
FIG. 2 is a perspective view from below showing the welding jig of FIG. 1.

Slidingly mounted on the frame 11 are two supports 21, 22 each of which is provided with a corresponding through slot 24, 25. As best seen in FIG. 2, the underside of the frame 11 is provided with a series of spaced apart apertures 27 which enable the supports 21, 22 to be located in any one of a number of predetermined positions. The positions are determined by means of two spring loaded plungers 31, 32. Each of the plungers 31, 32 is located within a corresponding externally threaded hollow sleeve 33, 34 and has a swing handle 35, 36 which abuts a corresponding ramped collar 37, 38.

As a consequence of the above described construction, operation of the handles 35, 36 enables the supports 21, 22 to be quickly engaged with, or disengage from, the apertures 27 to thereby provide a quick first horizontal adjustment mechanism which provides for a coarse adjustment of the position of the supports 21, 22 relative to the frame 11. Extending across the distal ends of the supports 21, 22 is a chain 40.

Slidingly located within the slots 24, 25 is a corresponding one of two vise parts 43, 44 each of which has an internally threaded collar 45, 46. A threaded bar 47, 48 is rotatably mounted in a corresponding one of two clamps 51, 52 which are preferably provided with a V-shaped mouth 53, 54 so as to easily grasp the horizontal rail 2. A corresponding pair of handles 55, 56 enables the threaded bars 47, 48 to be rotated to thereby adjust the position of the V-shaped mouths 53, 54 relative to the frame 11. Thus the threaded bars 47, 48 provide a second horizontal adjustment mechanism which provides for a fine adjustment of the position of the V-shaped mouths 53, 54.

It will be apparent to those skilled in the art from the foregoing that two of the above described jigs 3 can be used to quickly and securely hold the horizontal rail 2 in its intended final welded position. Each of the jigs 3 is clamped to a corresponding one of, typically, a pair of vertical posts 1 at roughly the intended height of the horizontal rail 2. Irrespective of whether the jigs 3 are mounted in the position illustrated in FIG. 1, or in the position illustrated in FIG. 2, or one "up" and one "down", each end of the horizontal rail 2 can be inserted into the space formed between the frame 11 and the chain 40. This holds the horizontal rail 2 in approximately the desired position. Then the single operator is able to pay attention to one end of the horizontal rail 2 and, if necessary, adjusts the position of the supports 21, 22. Then the horizontal rail 2 is clamped between the V-shaped mouths 53, 54. The handles 55, 56 can be rotated for the final horizontal adjustment of the rail 2. Similarly, the threaded disc 17 can be rotated for the final, fine, adjustment of the vertical position of the rail 2.

The identical procedure is then carried out at the other end of the horizontal rail 2. Normally this is sufficient, but final adjustments can be made to each end again, if necessary. Then the sole operator is able to weld each end of the horizontal rail 2 in turn whilst the rail 2 is held in the desired position. Thus the welder requires no other human assistance.

As seen in FIGS. 4-9, a jig of a second embodiment is illustrated and in which like elements to the first embodiment have a designation increased by 100. As for FIGS. 1 and 2, a portion of a cattle yard under construction is illustrated and, in particular, a vertical post 101 and a horizontal rail 102 which are about to be welded are illustrated. The post 101 and rail 102 are held in the intended final position by means of the jig 103 of the second embodiment.

Figure 4:
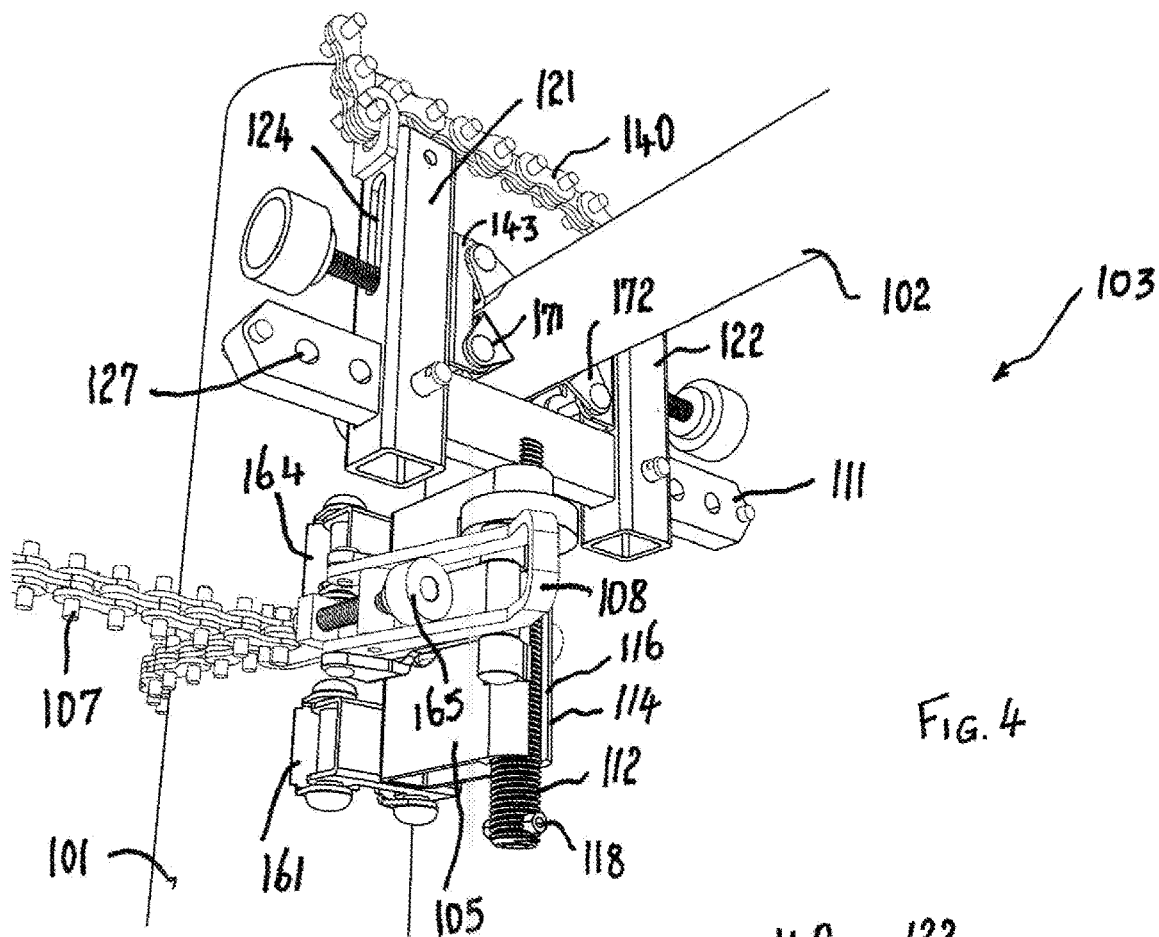
FIG. 4 is a perspective view from below and to one side of the welding jig of the second embodiment.

The jig 103 has a generally rectangular base 105 from which a chain 107 extends. As seen in FIGS. 4 and 7, the chain 107 is engaged with an over centre toggle arm 108. As a consequence, the chain 107 and arm 108 together constitute a clamp which enables the base 105 to be clamped to the vertical post 101.

Located above the base 105 is a horizontal frame 111 from which a fixed threaded rod 112 extends downwardly. The threaded rod 112 passes through two sleeves 113, 114. The lower sleeve 114 is slotted at 116. The threaded rod 112 also passes through a rotatable female threaded disc 117. The free end of the rod 112 has an aperture through which a roll pin 118 is inserted, thereby retaining the rod 112 within the sleeves 113, 114. As a consequence, rotating the threaded disc 117 first one way and then the other either raises or lowers the frame 111.

Figure 5:
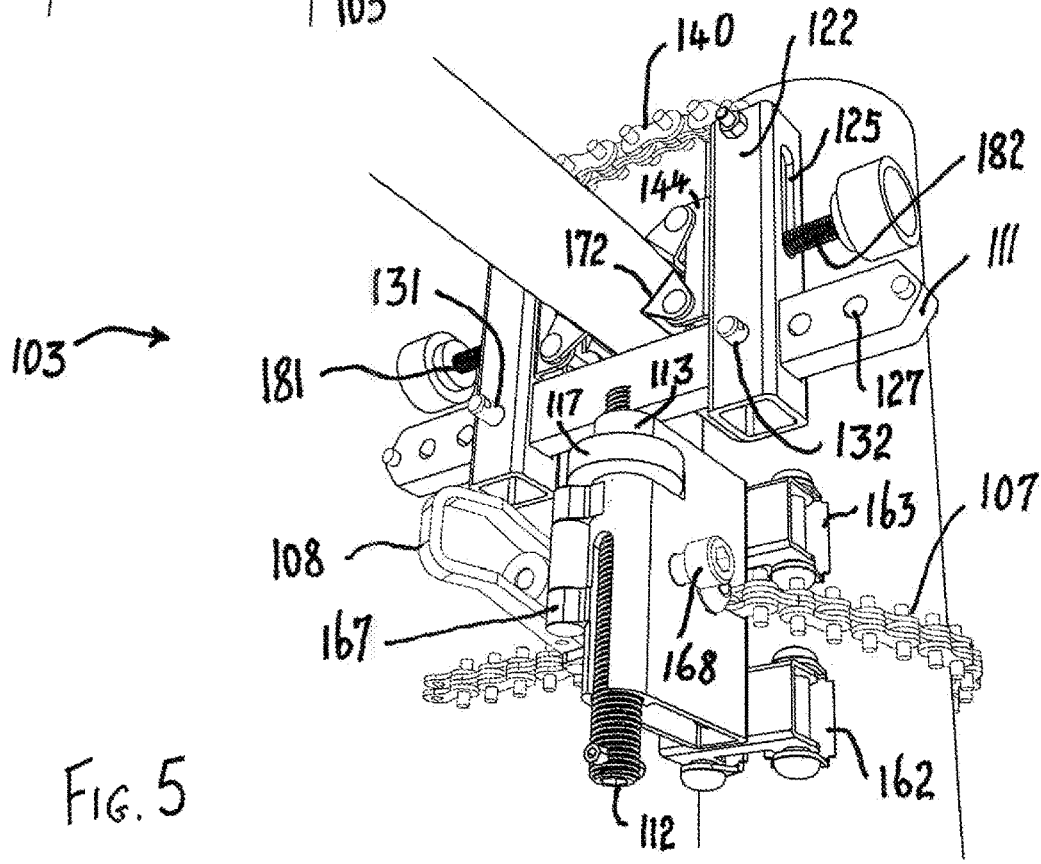
FIG. 5 is a perspective view from below and to the other side of the welding jig of FIG. 4.
Figure 8:
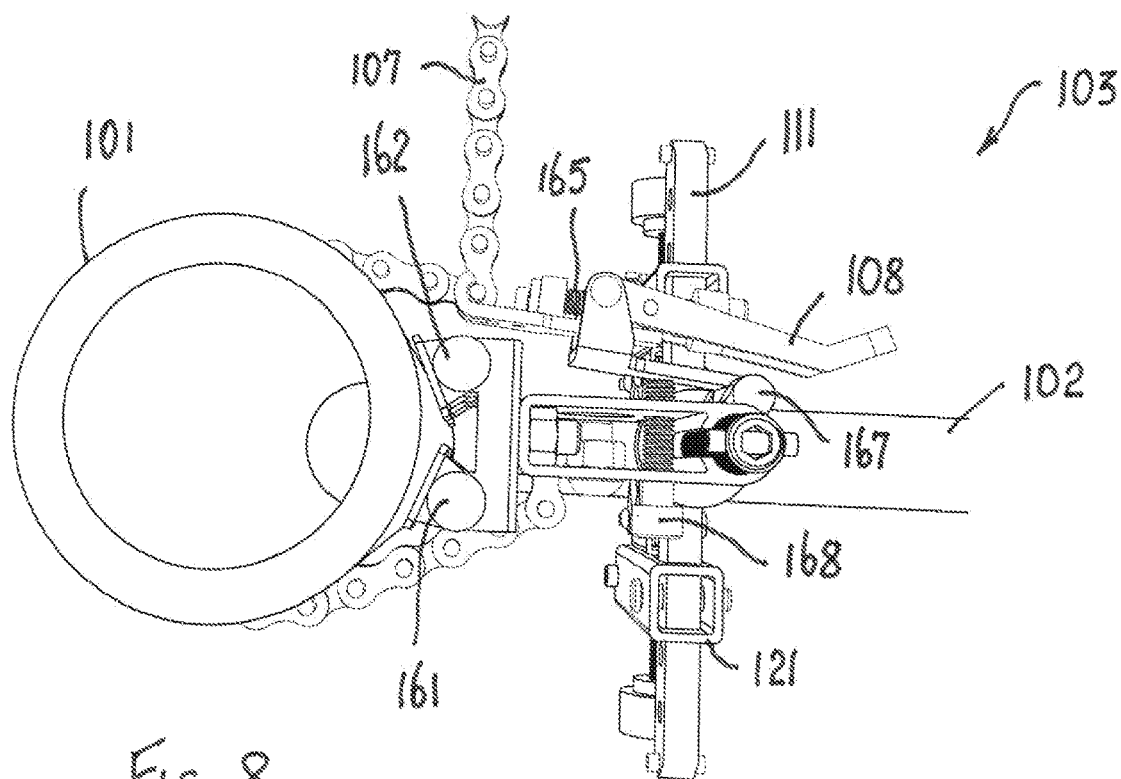
FIG. 8 is a near vertical inverted view of the welding jig of FIG. 4.

Extending outwardly from the base 105 are two pairs of pivotally mounted pads 161, 162 and 163, 164. Each of these pads is preferably provided with a built-in permanent magnet which therefore enables the base 105 in most instances to adhere to the vertical steel post 101. This is an advantage in securing the chain 107 by means of the over centre toggle arm 108. In known fashion the arm 108 has a first adjustment screw 165 which enables the tension within the clamped chain 107 to be adjusted. In addition, the toggle arm 108 is pivoted on a hinge 167 mounted on the base 105. As best seen in FIGS. 5 and 8, a second adjustment screw 168 is threadably engaged with the base 105 and extends through it to abut the toggle arm 108. As a consequence, the second adjustment screw 168 can be manipulated to change the rest position of the toggle arm 108. This enables the clamp associated with the base 105 to cater for a wide variety of vertical posts 101 having different diameters.

It will be apparent from the foregoing that the chain 107 and toggle arm 108 constitute a first vertical adjustment mechanism which permits a coarse vertical adjustment of the frame 111 to be made, whilst the threaded disc 117 and threaded rod 112 constitute a second vertical adjustment mechanism which permits a fine vertical adjustment of the frame 111 to be made.

Slidingly mounted on the frame 111 are two supports 121, 122 each of which is provided with a corresponding through slot 124, 125. The frame 111 is provided with a series of spaced apart apertures 127 which enable the supports 121, 122 to be located in any one of a number of predetermined positions. The positions are determined by means of two pins 131, 132. Each of the pins 131, 132 is able to be inserted into, and withdrawn from, any one of the spaced apart apertures 127 and in this way determine the spacing between the two supports 121, 122.

This thereby provides a quick first horizontal adjustment mechanism which provides for a coarse adjustment of the position of the supports 121, 122 relative to the frame 111. Extending across the distal ends of the supports 121, 122 is a second chain 140.

Slidingly located within the slots 124, 125 is a corresponding one of two vie parts 143, 144 each of which has a one of two pairs of pads 171, 172 each of which is mounted on a corresponding threaded rod 181, 182 engaged with the supports 121, 122. The pads 171, 172 are again each preferably provided with a permanent magnet and thus easily grasp the horizontal rail 102. Thus the threaded rods 181, 182 provide a second horizontal adjustment mechanism which provides for a fine adjustment of the position of the pads 171, 172.

Figure 9:
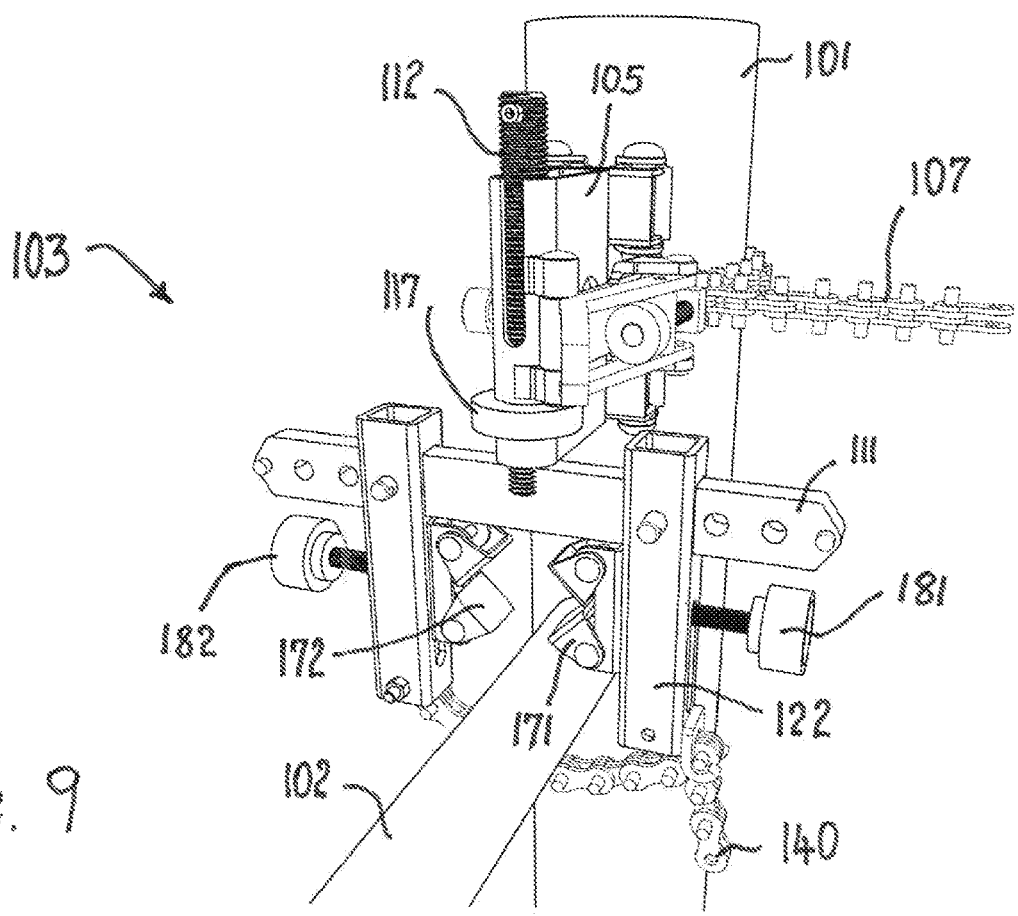
FIG. 9 is a perspective view of the welding jig of FIG. 4 in an "inverted" position showing the horizontal rail 102 prior to clamping.
Figure 10:
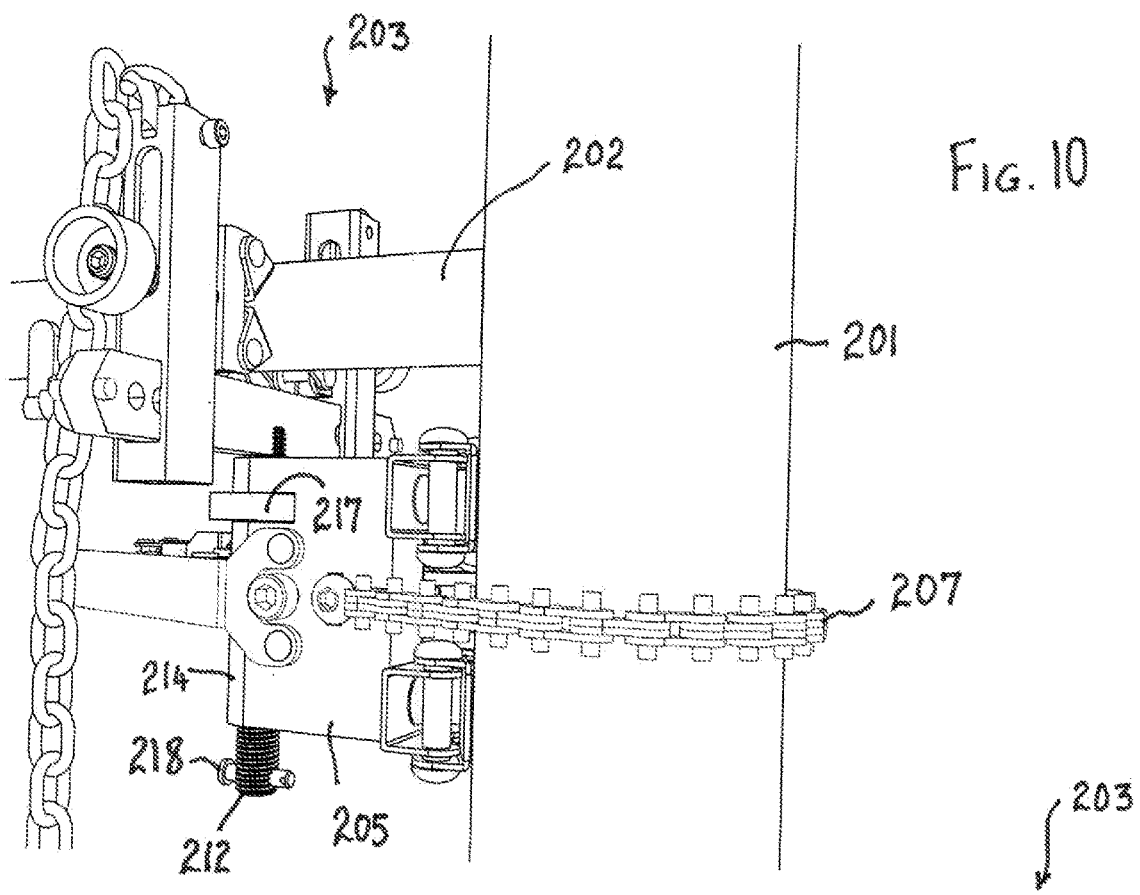
FIG. 10 is a horizontal view of the welding jig of a third embodiment in an upright position.

It will be apparent to those skilled in the art from the foregoing that two of the above described jigs 103 can be used to quickly and securely hold the horizontal rail 102 in its intended final welded position. Each of the jigs 103 is clamped to a corresponding one of, typically, a pair of vertical posts 101 at roughly the intended height of the horizontal rail 102. Irrespective of whether the jigs 103 are mounted in the position illustrated in FIGS. 4-7, or are inverted as seen in FIG. 9, each end of the horizontal rail 102 can be inserted into the space formed between the frame 111 and the second chain 140. This holds the horizontal rail 102 in approximately the desired position as seen in FIG. 9. Then the single operator is able to pay attention to one end of the horizontal rail 102 and, if necessary, adjusts the position of the supports 121, 122. Then the horizontal rail 102 is clamped between the pads 171, 172. The rods 181, 182 can be rotated for the final horizontal adjustment of the rail 102. Similarly, the threaded disc 117 can be rotated for the final, fine, adjustment of the vertical position of this end of the rail 102.

The identical procedure is then carried out at the other end of the horizontal rail 102. Normally this is sufficient, but final adjustments can be made to each end again, if necessary. Then the sole operator is able to weld each end of the horizontal rail 102 in turn whilst the rail 102 is held in the desired position. Thus the welder requires no other human assistance.

As seen in FIGS. 10-19, a jig of a third embodiment is illustrated and in which like elements to the second embodiment have a designation increased by 100. As for FIGS. 4-9, a portion of a cattle yard under construction is illustrated and, in particular, a vertical post 201 and a horizontal rail 202 which are about to be welded are illustrated. The post 201 and rail 202 are held in the intended final position by means of the jig 203 of the second embodiment.

Figure 16:
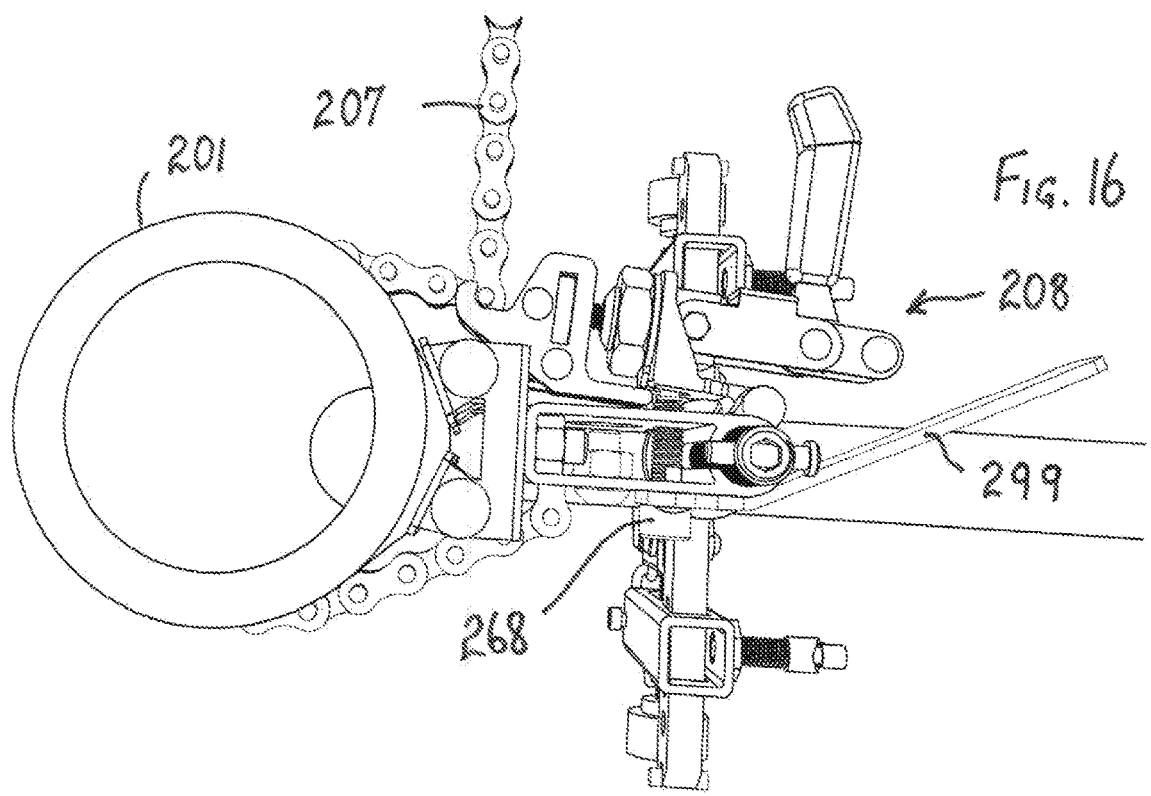
FIG. 16 is a near vertical view of the welding jig of the third embodiment.
Figure 18:
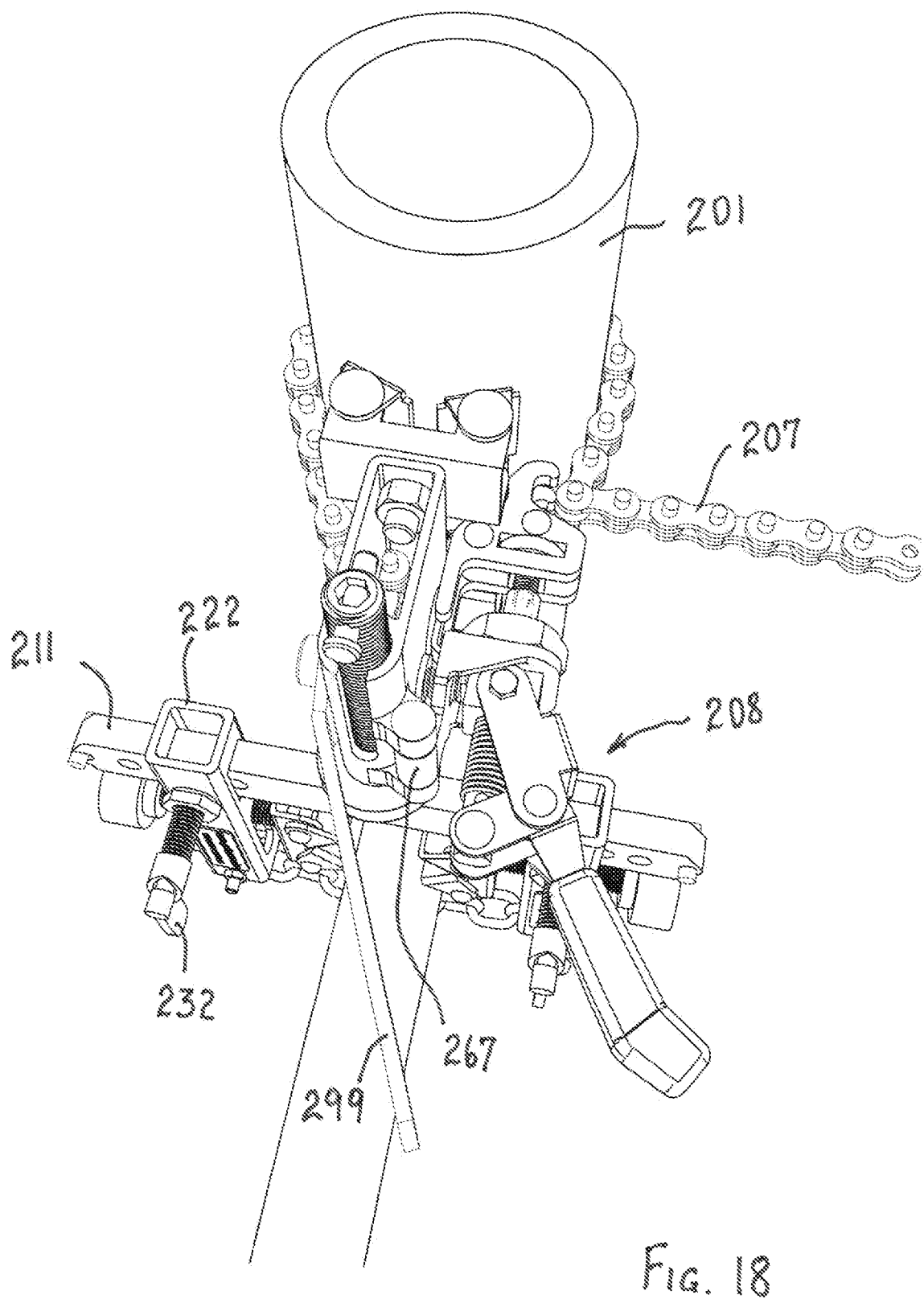
FIG. 18 is an inclined perspective view of the welding jig illustrated in FIG. 17.

The jig 203 has a generally rectangular base 205 from which a chain 207 extends. As seen in FIG. 16, the chain 207 is engaged with an over centre toggle arm 208. The over centre toggle arm 28 is pivoted relative to the base 205 by means of a hinge 267 (FIG. 18). As a consequence, the chain 207 and over centre toggle arm 208 together constitute a clamp which enables the base 205 to be clamped to the vertical post 201. A handle 299 is connected to the base 205 and assists in holding the base 205 in the desired position whilst the chain 207 is locked in place.

Figure 11:
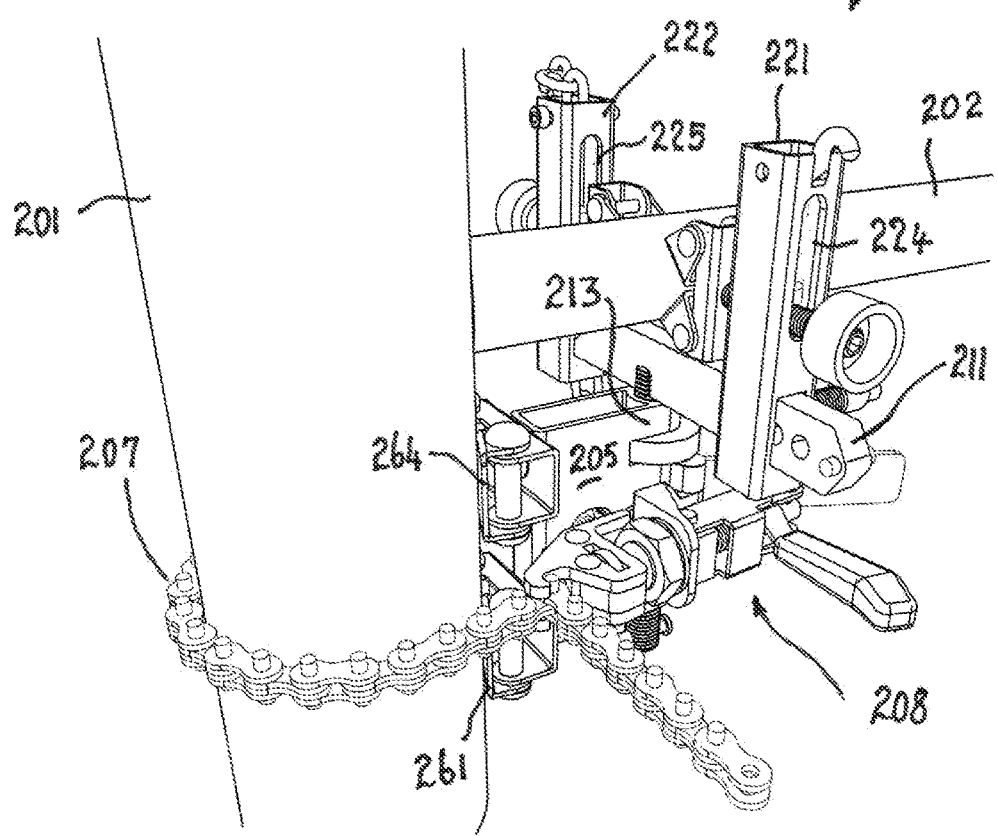
FIG. 11 is a perspective view of the welding jig of FIG. 10.
Figure 12:
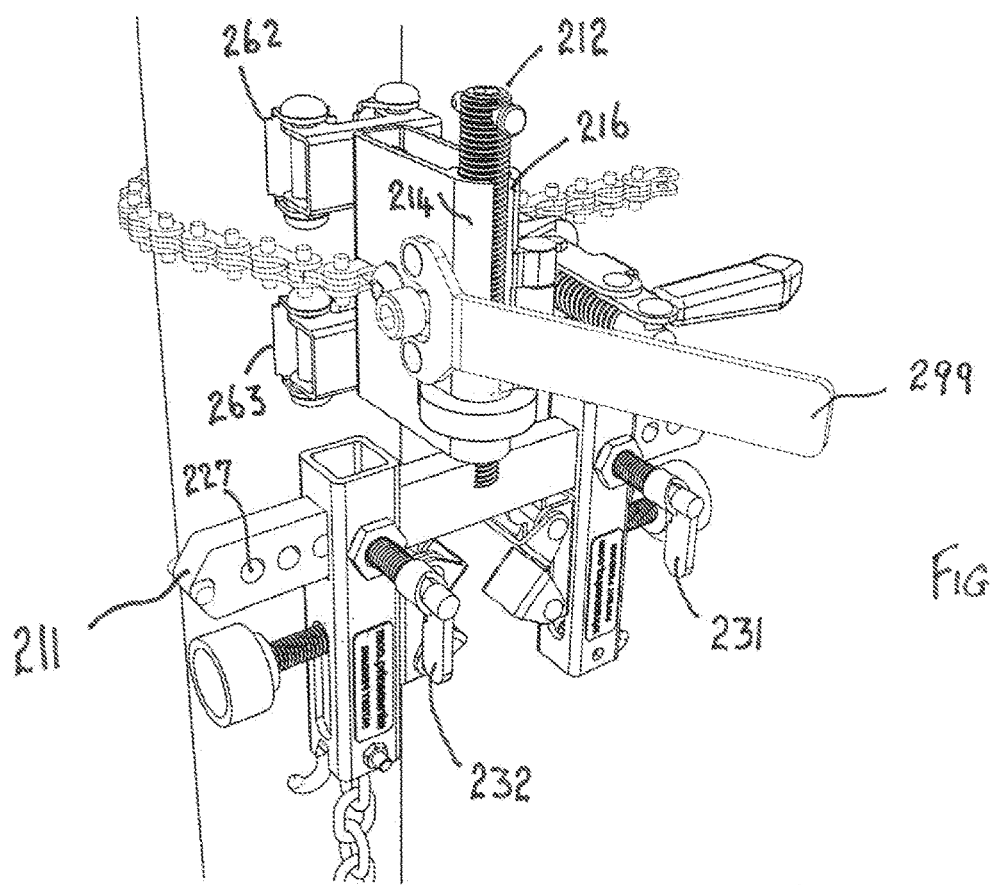
FIG. 12 is a perspective view of the welding jig of FIGS. 10 and 11 in an inverted position.
Figure 14:
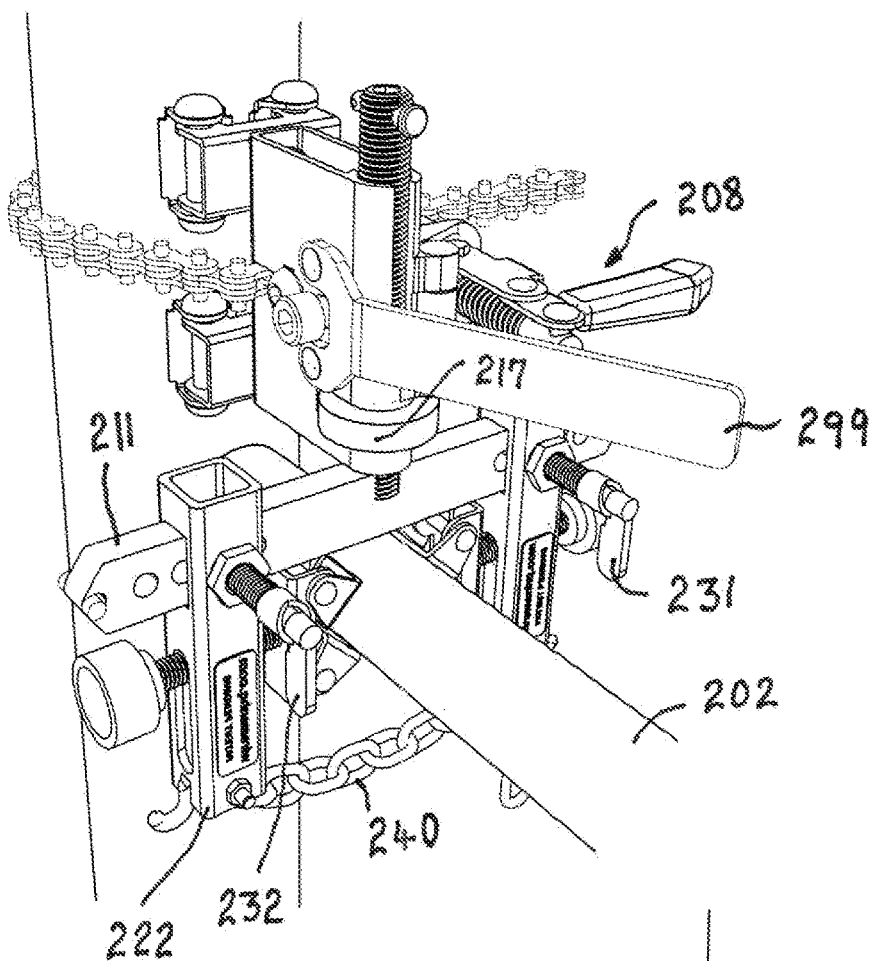
FIG. 14 is another perspective view but showing the horizontal rail held in its intended final position.
Figure 15:
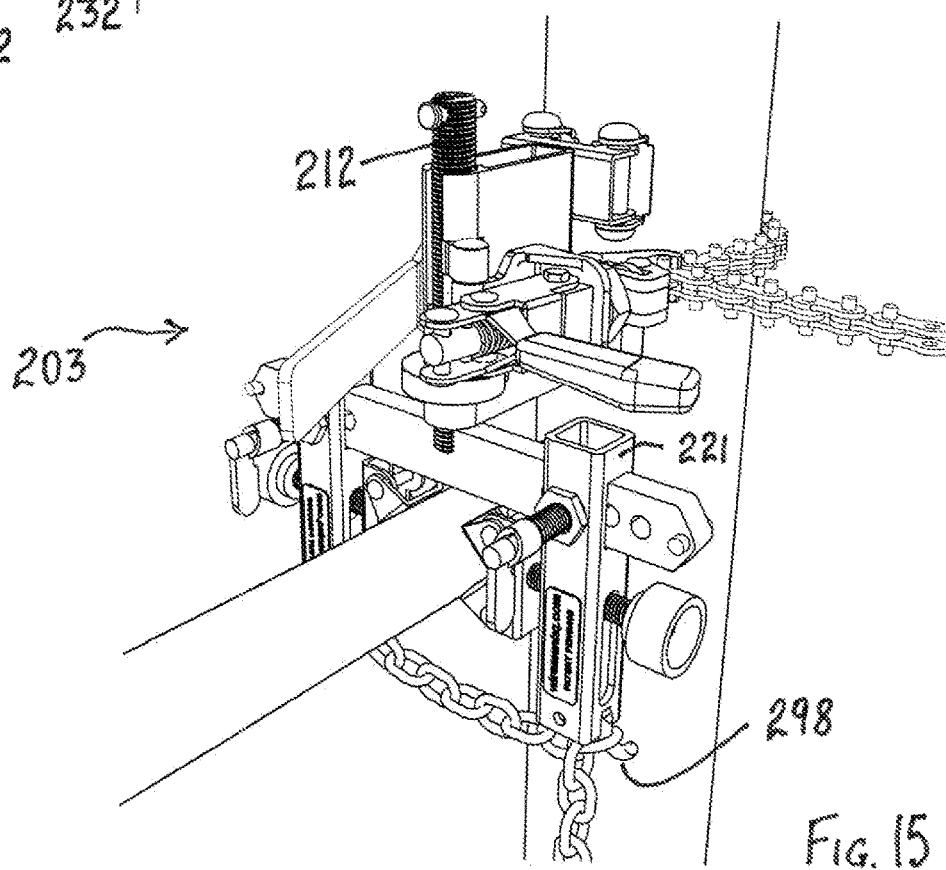
FIG. 15 is a view similar to FIG. 14 but from a different angle.

As see in FIG. 11, located above the base 205 is a horizontal frame 211 from which a fixed threaded rod 212 extends downwardly. The threaded rod 212 passes through two sleeves 213, 214. The lower sleeve 214 is slotted at 216 as best seen in FIG. 12. The threaded rod 212 also passes through a rotatable female threaded disc 217 (FIG. 14). The free end of the rod 212 has an aperture through which a pin 218 (FIG. 10) is inserted, thereby retaining the rod 212 within the sleeves 213, 214. As a consequence, rotating the threaded disc 217 first one way and then the other either raises or lowers the frame 211.

Extending outwardly from the base 205 are two pairs of pivotally mounted pads 261, 262 and 263, 264 (FIGS. 11 and 12). Each of these pads is preferably provided with a built-in permanent magnet which therefore enables the base 205 in most instances to adhere to the vertical steel post 201. This reduces the effort required by the operator in securing the chain 207 by means of the over centre toggle arm 208.

Figure 19:
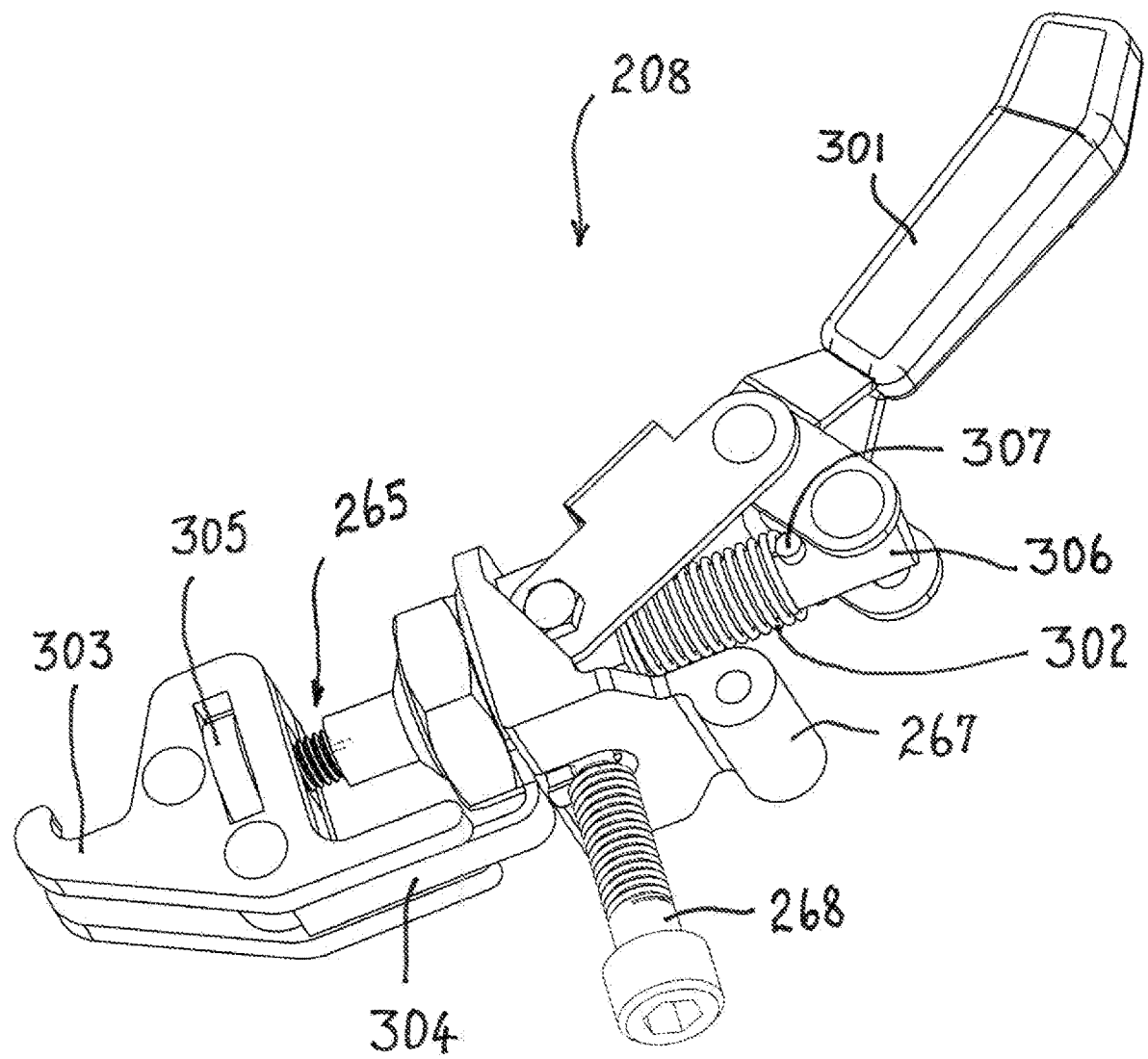
FIG. 19 is a perspective view of the toggle arm arrangement.

As seen in FIG. 19, the over centre toggle arm 208 differs substantially from the over centre toggle arm 108 in that it is a spring loaded over centre clamp that allows the hook 303 to be easily extended to grab the chain 207. This is achieved by squeezing the clamp handle 301 to move it towards the frame handle 299. By doing this the spring 302 is compressed and the hook 303 is moved forwardly towards the post 201. When the hook 303 has been loosely engaged with the chain 207, the handle 301 is released. This causes the spring 302 to urge the fixed transverse pin 307 of the central rod 306 backwardly away from the post 201. As a consequence, the clamp chain 207 loosely grips the pipe 201 and does not fall away from hook 303. An adjustment screw 265 enables the tension within the clamped chain 207 to be adjusted. This is achieved by rotating the knurled disc 305 which is secured to the adjustment screw 265.

The hinge 267 as seen in FIG. 19 has an extension plate 304 that slidingly engages with the hook 303 to prevent the hook 303 from twisting out of position as it is manipulated to grip the chain 207. Full clamping force is then achieved by pushing the over centre clamp handle 301 towards the hook 303. In addition, since the toggle arm 208 is pivoted on a hinge 267 (FIG. 18) mounted on the base 205, a second adjustment is possible. As best seen in FIG. 16, a second adjustment screw 268 is threadably engaged with the base 205 and extends through it to abut the toggle arm hinge 267. As a consequence, the second adjustment screw 268 can be manipulated to change the rest position of the toggle arm 208. This enables the clamp associated with the base 105 to cater for a wide variety of vertical posts 201 having different diameters.

It will be apparent from the foregoing that the chain 207 and toggle arm 208 constitute a first vertical adjustment mechanism which permits a coarse vertical adjustment of the frame 211 to be made, whilst the threaded disc 217 and threaded rod 212 constitute a second vertical adjustment mechanism which permits a fine vertical adjustment of the frame 211 to be made.

As seen in FIG. 11, slidingly mounted on the frame 211 are two supports 221, 222 each of which is provided with a corresponding through slot 224, 225. The frame 211 is provided with a series of spaced apart apertures 227 which enable the supports 221, 222 to be located in any one of a number of predetermined positions. The positions are determined by means of two pins 231, 232 (FIG. 12). Each of the pins 231, 232 is able to be inserted into, and withdrawn from, any one of the spaced apart apertures 227 and in this way determine the spacing between the two supports 221, 222.

Figure 13:
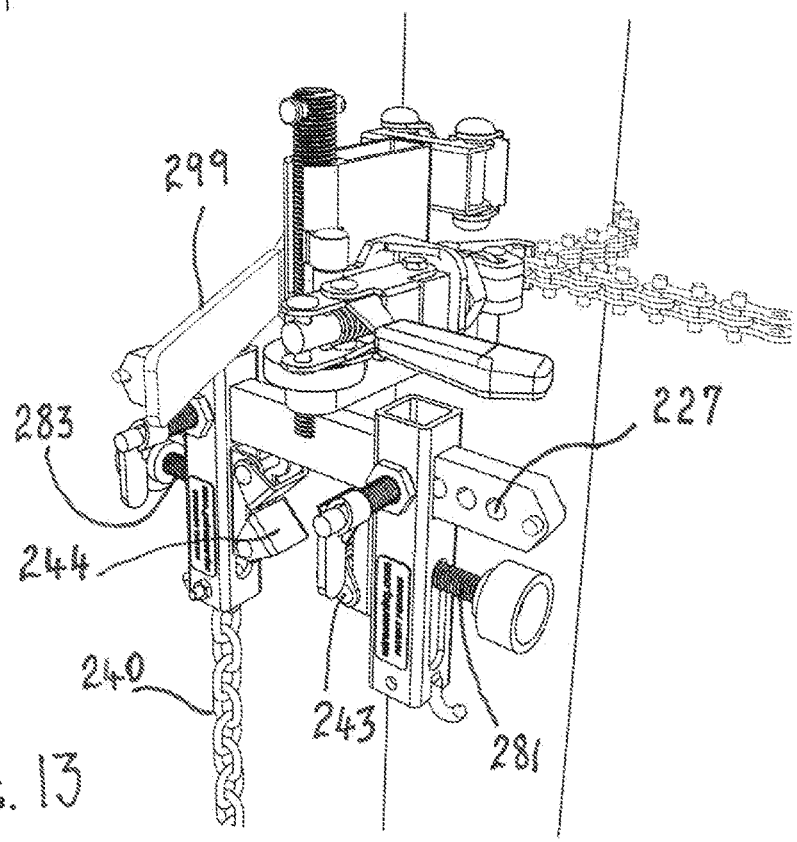
FIG. 13 is a perspective view similar to FIG. 12 but from a different angle.
Figure 17:
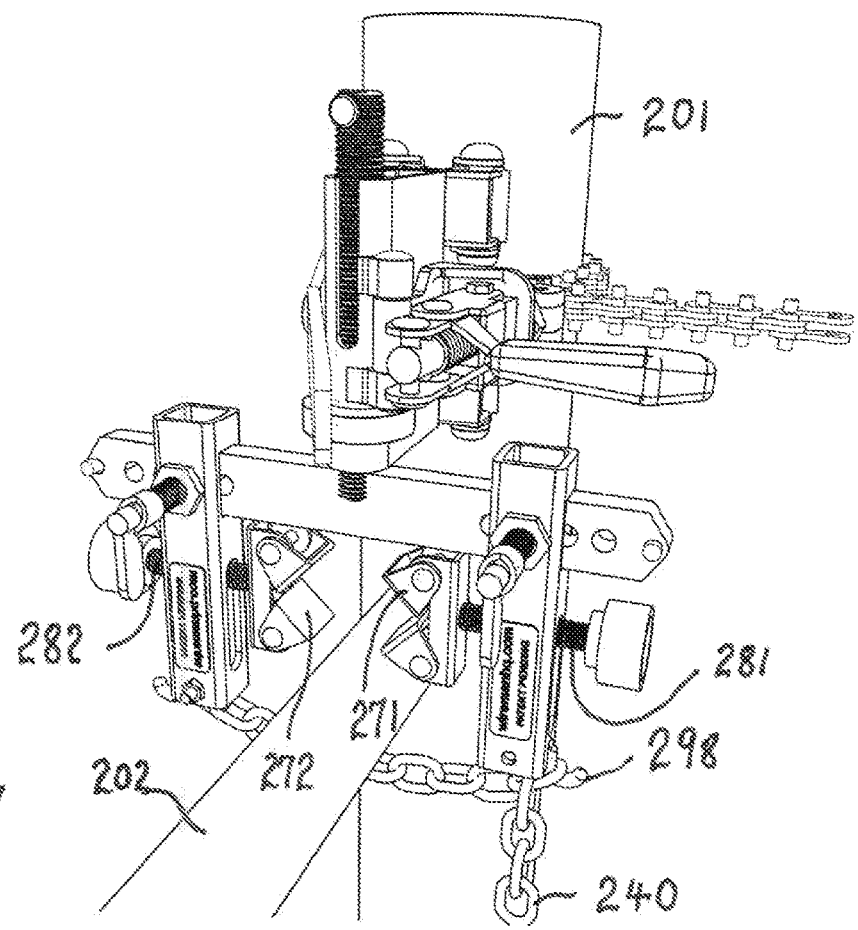
FIG. 17 is a near horizontal view showing the horizontal rail in its initial, rough, position.

This thereby provides a quick first horizontal adjustment mechanism which provides for a coarse adjustment of the position of the supports 221, 222 relative to the frame 211. Extending across the distal ends of the supports 221, 222 is a second chain 240 (FIGS. 13 and 14). Each distal end of the supports 221, 222 includes a hook 298 which enables the position of the second chain 240 to be easily adjusted and thereby determine a first rough position for the horizontal rail 202 as seen in FIG. 17.

As best seen in FIG. 13, slidingly located within the slots 224, 225 is a corresponding one of two vise parts 243, 244 each of which has a one of two pairs of pads 271, 272 (FIG. 17) each of which is mounted on a corresponding threaded rod 281, 282 engaged with the supports 221, 222. The pads 271, 272 are again each preferably provided with a permanent magnet and thus easily grasp the horizontal rail 202. Thus the threaded rods 281, 282 provide a second horizontal adjustment mechanism which provides for a fine adjustment of the position of the pads 271, 272.

It will be apparent to those skilled in the art from the foregoing that two of the above described jigs 203 can be used to quickly and securely hold the horizontal rail 202 in its intended final welded position. Each of the jigs 203 is clamped to a corresponding one of, typically, a pair of vertical posts 201 at roughly the intended height of the horizontal rail 202. Irrespective of whether the jigs 203 are mounted in the position illustrated in FIGS. 10 and 11, or are inverted as seen in FIGS. 12-18, each end of the horizontal rail 202 can be inserted into the space formed between the frame 211 and the second chain 240. This holds the horizontal rail 202 in approximately the desired position as seen in FIG. 17. Then the single operator is able to pay attention to one end of the horizontal rail 202 and, if necessary, adjusts the position of the supports 221, 222. Then the horizontal rail 202 is clamped between the pads 271, 272. The rods 281, 282 can be rotated for the final horizontal adjustment of the rail 202. Similarly, the threaded disc 217 can be rotated for the final, fine, adjustment of the vertical position of this end of the rail 202.

The identical procedure is then carried out at the other end of the horizontal rail 202. Normally this is sufficient, but final adjustments can be made to each end again, if necessary. Then the sole operator is able to weld each end of the horizontal rail 202 in turn whilst the rail 202 is held in the desired position. Thus the welder requires no other human assistance.

The foregoing describes only some embodiments of the present invention and modifications, obvious to those skilled in the welding arts, can be made thereto without departing from the scope of the present invention. For example, equivalents of each of the above described mechanisms can be used. Also the V-shaped mouths 53, 54 can be pivoted relative to the vise parts 43, 44 or can include pivoted pads 171, 172 to easily adjust to different rail diameters. The base 5, 105 can be similarly modified.

The term "comprising" (and its grammatical variations) as used herein is used in the inclusive sense of "including" or "having" and not in the exclusive sense of "consisting only of".

The invention claimed is:

1. A welding jig for holding a horizontal member relative to a vertical member, said jig comprising a base having a clamp able to clamp the base to the vertical member and constituting a first, coarse, vertical adjustment mechanism, a frame interconnected to said base by a first threaded member constituting a second, fine, vertical adjustment mechanism; a pair of supports slidingly mounted on said frame and movable between predetermined positions to constitute a first, coarse, horizontal adjustment mechanism;
and first and second vise parts each threadably mounted on a corresponding one of said supports and movable towards and away from each other to constitute a vise mechanism, said vise mechanism clamping said horizontal member and having a centre which is horizontally adjustable relative to said vertical member by adjustment of the threaded engagement between said supports and said vise parts.

2. The jig as claimed in claim 1 wherein said base clamp comprises a first chain able to be tightened about said vertical member.

3. The jig as claimed in claim 2 wherein said first chain is able to be tightened by a plier tool.

4. The jig as claimed in claim 2 wherein said first chain is able to be tightened by an over centre toggle arm.

5. The jig as claimed in claim 4 wherein the rest position of said over centre toggle arm is adjustable.

6. The jig as claimed in claim 5 wherein said over centre toggle arm is pivoted relative to a support and said support is pivoted to said base.

7. The jig as claimed in claim 6 wherein said over centre toggle arm is adjustable by adjusting the position of said support.

8. The jig as claimed in claim 2 wherein said first threaded member is rigidly connected to said frame and is threadably engaged with a rotatable adjustment member of said base.

9. The jig as claimed in claim 2 wherein said frame has a spaced apart sequence of apertures and each of said supports has an elongate member releasably engageable with one of said apertures to set said predetermined positions.

10. The jig as claimed in claim 2 wherein each of said supports has a slot therethrough, each of said vise parts has a female threaded member retained in a corresponding one of said slots, and a male threaded member passes through the corresponding female threaded member.

11. The jig as claimed in claim 2 wherein said vise parts comprise pivoted pads.

12. The jig as claimed in claim 1 wherein said first threaded member is rigidly connected to said frame and is threadably engaged with a rotatable adjustment member of said base.

13. The jig as claimed in claim 12 wherein said frame has a spaced apart sequence of apertures and each of said supports has an elongate member releasably engageable with one of said apertures to set said predetermined positions.

14. The jig as claimed in claim 12 wherein each of said supports has a slot therethrough, each of said vise parts has a female threaded member retained in a corresponding one of said slots, and a male threaded member passes through the corresponding female threaded member.

15. The jig as claimed in claim 12 wherein said vise parts comprise pivoted pads.

16. The jig as claimed in claim 1 wherein said frame has a spaced apart sequence of apertures and each of said supports has an elongate member releasably engageable with one of said apertures to set said predetermined positions.

17. The jig as claimed in claim 16 wherein each of said supports has a slot therethrough, each of said vise parts has a female threaded member retained in a corresponding one of said slots, and a male threaded member passes through the corresponding female threaded member.

18. The jig as claimed in claim 1 wherein each of said supports has a slot therethrough, each of said vise parts has a female threaded member retained in a corresponding one of said slots, and a male threaded member passes through the corresponding female threaded member.

19. The jig as claimed in claim 18 wherein a second chain extends between said supports.

20. The jig as claimed in claim 1 wherein said vise parts comprise pivoted pads.

* * * * *